United States Patent
Zhang

(10) Patent No.: US 6,968,494 B2
(45) Date of Patent: Nov. 22, 2005

(54) METHOD AND APPARATUS FOR ADAPTIVELY CODING A DATA SIGNAL

(75) Inventor: Yumin Zhang, Plainsboro, NJ (US)

(73) Assignee: Sarnoff Corporation, Princeton, NJ (US)

(*) Notice: Subject to any disclaimer, the term of this patent is extended or adjusted under 35 U.S.C. 154(b) by 749 days.

(21) Appl. No.: 09/804,877

(22) Filed: Mar. 13, 2001

(65) Prior Publication Data

US 2001/0037485 A1    Nov. 1, 2001

(51) Int. Cl.[7] ............................................. H03M 13/03
(52) U.S. Cl. ...................................................... 714/790
(58) Field of Search ............................... 714/755, 786, 714/790; 375/280

(56) References Cited

U.S. PATENT DOCUMENTS 5,416,787 A * 5/1995 Kodama et al. ............ 714/790
5,878,085 A * 3/1999 McCallister et al. ........ 375/280
6,430,722 B1 * 8/2002 Eroz et al. ................... 714/755

OTHER PUBLICATIONS

Rowitch et al., On the performance of hybrid FEC/ARQ systems using rate compatible punctured turbo (RCPT) codes, Jun. 2000, IEEE Trans. on Comm., vol. 48, No. 6, p. 948-959.*

* cited by examiner

*Primary Examiner*—Shelly Chase
(74) *Attorney, Agent, or Firm*—William J. Burke, Esq.

(57) ABSTRACT

A method and apparatus for transmitting an input data signal over an information channel. The input data signal comprises a sequence of data blocks. A puncture coded signal is generated for each data block in the sequence of data blocks. The total number of bits in the puncture coded signal is equal to the number of bits in a particular data block plus additional error correcting bits used to perform error correction at a receiver. The number of error correcting bits is adaptively adjusted for each data block in response to a channel quality measure for the information channel.

25 Claims, 3 Drawing Sheets

METHOD AND APPARATUS FOR ADAPTIVELY CODING A DATA SIGNAL

The invention relates to data transmission and, more particularly, the invention relates to adaptive coding of a data signal that is transmitted over an information channel.

BACKGROUND OF THE DISCLOSURE

The transmission of data signals over a communication network is subject to various problems in a transmission medium or channel. Problems such as noise, channel fading and multipath may cause errors in decoding the transmitted signal. To counter these problems, additional or redundant information is transmitted with the signal. A corresponding receiver would use this redundant information to perform error correction on the received signal. Otherwise, the receiver may either erroneously decode the received signal or require retransmission of the data signal.

In a digital data signal, the additional information is typically in the form of additional or redundant bits in a digital bit sequence. For example, to provide error correction in an MPEG-2 (MPEG: Moving Pictures Expert Group) packet, twenty additional bytes are added to the 179 bytes of data. Moreover, to combat severe channel interference, the amount of additional bits may approach the amount of data transmitted. A convolutional encoder having a 0.5 code rate would, for example, generate eight output bits for every four input bits of the digital bit sequence.

The use of additional error correcting bits is provided at the expense of having a lower data transmission rate. As such, if the transmission medium or information channel is of high quality, these additional error correcting bits creates an unnecessary overhead for the receiver. Therefore, a need exists in the art to reduce the number of redundant bits transmitted over existing error correction techniques.

SUMMARY OF THE INVENTION

The present invention provides a method and apparatus for transmitting an input data signal over an information channel. The input data signal comprises a sequence of data blocks. A puncture coded signal is generated for each data block in the sequence of data blocks. The total number of bits in the puncture coded signal is equal to the number of bits in a particular data block plus additional error correcting bits used to perform error correction at a receiver. The number of error correcting bits is adaptively adjusted for each data block in response to a channel quality measure for the information channel.

In one embodiment, a gateway transmits a puncture coded signal to at least one communications appliance within a residence or enterprise. Each communications appliance is outfitted with a data receiver that receives the puncture coded signal broadcast from the gateway over a wireless local area network. The data receiver evaluates the received signal to determine a channel quality measure for an information channel in the network. The channel quality measure is sent back to the gateway, where the puncture code is adaptively generated in response to the channel quality measure.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
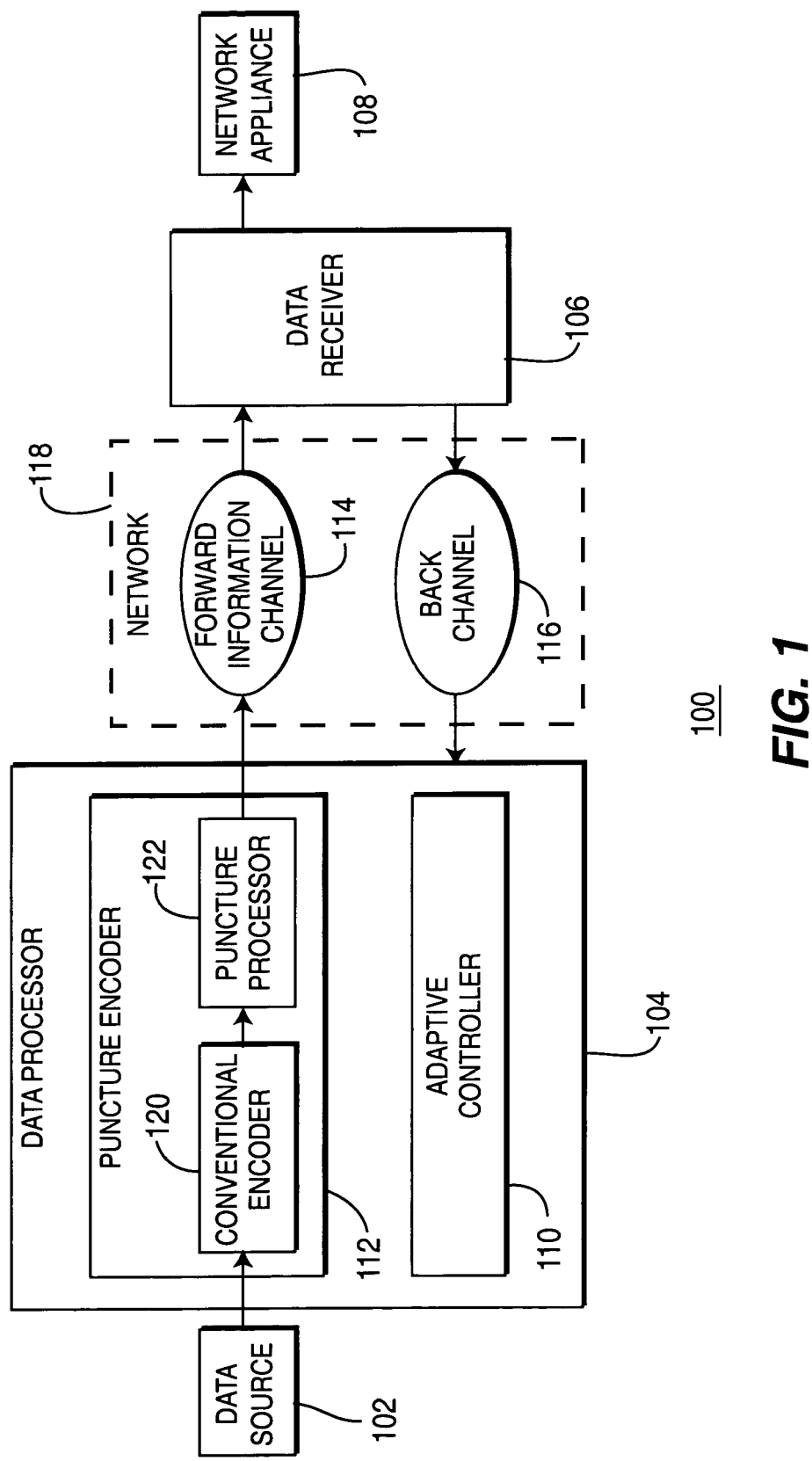
FIG. 1 depicts a block diagram of a data communications system in accordance with the present invention.

FIG. 1 depicts a block diagram of a data communications system 100. In accordance with the present invention, the data communications system 100 uses a novel adaptive puncture coding method to transmit a data signal over an information channel 114. Specifically, the system 100 comprises a data source 102, a data transmitter 104, a data receiver 106 and a network appliance 108. Transmission of data signals and control signals between the data transmitter 104 and the data receiver 106 occurs over a network 118 comprising a forward information channel 114 and a back channel 116.

The data source 102 provides a data signal or any type of information that is coupled to the data transmitter 104 and transmitted through the forward information channel 114 of the network 118. Examples of the data source 102 include a cable feed, a xDSL (digital subscriber line) feed, a POTS (plain old telephone system) feed, a satellite television feed, an over-the-air television antenna, and the like. Although one data source 102 is shown in FIG. 1, the system 100 may likewise receive data from a plurality of data sources 102.

The data transmitter 104 receives the data signal from the data source 102, encodes the received signal, and transmits the encoded signal over the network 118. The data signal comprises a sequence of data blocks. Each data block comprises a plurality of bits within the sequence of data blocks. In accordance to the present invention, the data transmitter 104 adaptively adjusts, in response to a channel quality measure, the amount of data to transmit for each data block. The data transmitter 104 comprises an adaptive controller 110 and a puncture encoder 112. One embodiment of the data transmitter 104 is further described below with respect to FIG. 2.

The adaptive controller 110 receives a control signal from the back channel 116 and determines an appropriate code rate for the puncture encoder 112. In one embodiment, the adaptive controller 110 determines this code rate by using a look up table or puncture matrix for the puncture encoder 112. The code rate is the ratio of bits in an input data block to the total number of output bits the puncture encoder 112 generates for each data block. For example, if the code rate is 0.8, then the puncture encoder 112 generates 5 bits, i.e., one error correcting bit, for a particular data block of four bits within the data signal.

The control signal contains a channel quality measure for the forward information channel 114. Examples of such a channel quality measure include signal to noise ratio (SNR), bit error rate (BER), and the like. Although the control signal is illustratively received from the data receiver via the back channel 116, the present invention is also applicable to control signals received from other sources. In another embodiment, the data transmitter 104 may also determine the channel quality measure and provide the control signal to the adaptive controller 110.

The puncture encoder 112 generates a puncture coded signal from the received data signal. In one embodiment, the puncture encoder 112 comprises a conventional encoder 120 and a puncture processor 122. The encoder encodes the data signal with additional error correcting bits for each data block, e.g., a predetermined number of bits, in the input data signal. This encoded signal is referred to herein as a channel coded signal. The puncture processor 122 "punctures" or reduces the number of error correcting bits in the channel coded signal in response to the channel measure quality. As such, the puncture processor 122 may drop or eliminate the number of redundant error correcting bits that would have been provided by the conventional encoder 120, e.g., a Trellis encoder, a Reed-Solomon encoder, a combination Reed-Solomon and Trellis encoder, and the like. The particular error correcting bits to be punctured are determined by the adaptive controller 110. However, in another embodiment, the puncture encoder 112 would determine the particular error correcting bits to be punctured or particular error correcting bits to be transmitted.

The generated puncture coded signal has a total number of bits that is equal to a number of bits in the received data signal plus an adjustable number of redundant error correcting bits. Namely, for each data block in the received data signal or the sequence of data blocks, the puncture encoder 112 generates an adjustable number of redundant bits as determined by the adaptive controller 110 in response to a channel quality measure. As such, the generated puncture coded signal will usually have less redundant error correcting bits than a signal generated from just the conventional encoder 120.

To illustrate an example, a systematic encoder, e.g., a Trellis encoder having a 0.5 code rate, generates four redundant error correcting bits for every four bits of the input signal, i.e., for each four bit data block of the input signal. If these bits are transmitted over a channel with a low bit error rate or a high signal to noise ratio, then an unnecessary amount of additional bits would have been transmitted by the convolution encoder. In contrast, the puncture encoder 112 generates 1 to 4 redundant error correcting bits for every four bits of the input signal. Thus, over a long data sequence, e.g., a television program, the puncture encoder 112 significantly reduces the number of redundant bits transmitted over forward information channel 114 of the network 118.

The adaptive nature of the puncture encoder 112 depends upon the adaptive controller 110 that adaptively determines the number of redundancy or error correcting bits based on the channel quality measure. For example, if the channel quality measure indicates a high information channel quality, e.g., high SNR or low BER, the adaptive controller 110 decreases the number of error correcting bits transmitted by the puncture encoder 112. Similarly, if the channel quality measure indicates a low information channel quality, e.g., low SNR or high BER, the adaptive controller 110 increases the number of error correcting bits transmitted by the puncture encoder 112. A decrease in the number of error correcting bits increases the code rate of the puncture encoder 112, while an increase in the number of error correcting bits decreases the code rate of the puncture encoder 112. The exact type of channel quality measures and values for channel quality is determined by a system designer of the communications system 100. Moreover, the channel measure is dependent on the type of data transmitted over the forward information channel 114 and the type of system 100.

The puncture coded data is transmitted downstream via the forward information channel 114 of the network 118. The capacity of the forward information channel 114 is dependent on the network 118. In one exemplary 5.6 GHz wireless network, the forward information channel 114 is one of fifty 6 MHz channels capable of supporting a 40 Mbps broadband download or a 10 Mbps internet downlink. Additionally, the forward information channel 114 may be used to transmit control information from the data transmitter 104 to the data receiver 106.

The data receiver 106 receives the puncture coded data from the forward information channel 114, decodes the received data and converts the decoded data into a format suitable for a network appliance 108. The data receiver 106 also determines the channel quality measure for the forward information channel 114. Such a channel quality measure may be embodied in a control signal that is transmitted over the back channel 116 to the data transmitter 104. One embodiment of the data receiver 106 is further described below with respect to FIG. 3.

The data receiver 106 is coupled to the network appliance 108 and the back channel 116. The network appliance 108 comprises any device for receiving decoded and processed data from the data receiver 106. Examples of the network appliance 108 include a television, a personal computer, an A/V (audio/video) appliance, a residential environmental counter, and the like.

The back channel 116 is used to transmit an upstream control signal from the data receiver 106 back to the data transmitter 104. In the present invention, the control signal comprises the channel quality measure for the forward information channel 114. However, other applications of the back channel 116 are possible. For example, the back channel 116 may be used for supporting an internet uplink at 1 Mbps.

Although one data transmitter 104 and one data receiver 106 are depicted in the system 100 of FIG. 1, the system 100 may comprise a plurality of data transmitters 104 for transmitting puncture coded data to a plurality of data receivers 106 coupled to various appliances 108.

Figure 2:
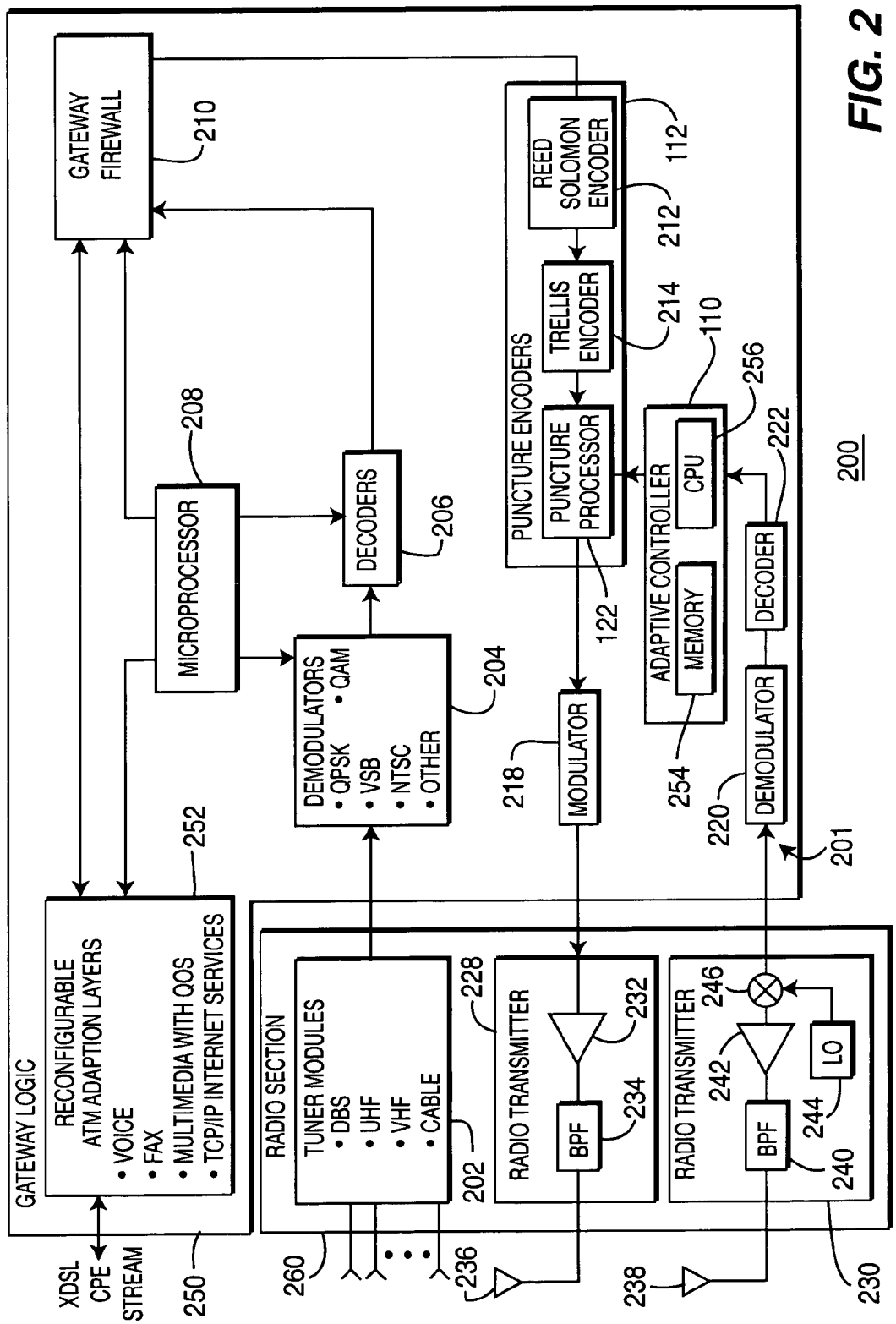
FIG. 2 depicts a block diagram of one embodiment of a data transmitter of FIG. 1.

FIG. 2 depicts a detailed block diagram of one embodiment of the data transmitter 104 of FIG. 1. The exemplary data transmitter 104 comprises a gateway 200 for transmitting various types of data over a residential or enterprise broadband wireless network, e.g., a small home office (SOHO) wireless network. However, the present invention applies to any use of adaptive puncture coding over any type of network.

The gateway 200 comprises a gateway logic 250 and a radio section 260. The radio section 260 comprises a plurality of tuner modules 202, a radio transmitter 228 and a radio receiver 230. The gateway logic 250 comprises a plurality of demodulators, decoders 206, a reconfigurable ATM adaptation layer 252, a microprocessor 208, a gateway firewall 210, a forward error correction encoder 212, a puncture encoder 112, an adaptive controller 110, a modulator 218, a demodulator 220 and a decoder 222.

The various sources of RF signals are coupled to the tuner modules 202 that select particular signal channels for reception. Examples of tuner modules 202 include direct broadcast satellite (DBS), ultra-high frequency (UHF), very high frequency (VHF), and the like. The tuner modules 202 filters and downconverts data for each of the channels selected by a user or users of the communications system 100. The channels are selected in response to a signal provided over the back channel link 116 from the data receiver 106 to the gateway 104.

The demodulators 204 demodulate the down converted signals. The decoders 206 then decode the signals including performing error correction to form baseband video. The baseband video is coupled to the gateway interface (firewall 210). The tuner modules 202, the demodulators 204, and the decoders 206 are all controlled by the microprocessor 208.

The reconfigurable ATM adaptation layer 242 couples the gateway firewall 210 to an xDSL CPE (customer premises equipment) stream to enable the use of the system 100 for distributing voice, data, fax, multimedia content, and TCP/IP Internet services throughout a residence or an enterprise. The content from the xDSL stream can then be displayed using a network appliance 108.

The gateway firewall 210 digitizes the decoded signals (if necessary) and provides firewall services. The firewall services ensure that unauthorized users cannot access the gateway from outside the residence without proper authority. Additionally, the gateway firewall 210 may provide encryption to ensure that neighboring residences are not capable of viewing each other's programming. The gateway firewall 210 uses a well-known protocol, e.g., the media access control (MAC) protocol, to provide firewall and encryption services.

The encrypted baseband video signals are coupled to the puncture encoder 112 comprising a conventional encoder 120 and a puncture processor 122. Illustrative conventional encoders 120 include a Reed-Solomon encoder 212 and a Trellis encoder 214. In the current embodiment, the conventional encoder 120 comprises a combination encoder, i.e., the Reed-Solomon encoder 212 and the Trellis encoder 214. The combination encoder 212 and 214 generates a channel coded signal, e.g., an initial encoded video signal, that is adjusted by the puncture processor 122 in response to a control signal from the adaptive controller 110. However, the puncture encoder 112 is not limited to such a combination encoder to generate the initial encoded video signal. Namely, the puncture encoder 112 may use any type of block or conventional encoder to generate the initial video signal that is adjusted by the puncture processor 122.

The Reed-Solomon encoder 212 codes the baseband video signal into a block coded signal that allows for error recovery at a decoder in a receiver 106. The Reed-Solomon block code enables for correcting errors that may occur in bursts, e.g., multiple errors occurring in a single block, in a transmitted signal. Note that the size of such a block is dependent on the encoder, e.g., the size of this block in the Reed-Solomon encoder 212 is not necessarily the same as the size of a data block input of the puncture encoder 112. In one embodiment, 6 redundancy or error correction bytes are appended to every 122 bytes of digital television data. If an error occurs, the exact location of the error in the packet can be identified and corrected, and the original data can be reconstructed. As such, the Reed-Solomon encoding allows for the correction of up to 3 byte errors per Reed-Solomon frame.

The Reed-Solomon coded signal is optionally interleaved prior to entering the Trellis encoder 214. The interleaving is a reordering of the Reed-Solomon block symbols over a predetermined block length, such that effects of error burst is further minimized. The Trellis encoder 214 performs a convolutional coding on the Reed Solomon block coded signal to achieve a better error performance over a single encoder. In one embodiment, the Trellis encoder 214 having a 0.5 code rate would generate 8 output bits for every four bits of the input data, i.e, for each four-bit data block of input data. Namely, the Trellis encoder 214 generates 4 redundant or error correcting bits for every four bits of the input signal. Thus, the channel coded signal, e.g., Trellis coded signal, provides additional error correction capability at the cost of redundant or additional error correcting bits. However, such a coding scheme transmits an unnecessary amount of bits over a forward information channel 114 of high quality, e.g., a low error rate or high signal to noise ratio.

The puncture processor 122 generates a puncture coded signal from the signal encoded from the FEC encoder, e.g., a combination Reed-Solomon encoder 212 and Trellis encoder 214. Specifically, the illustrative puncture processor 122 uses a signal received from the adaptive controller 110 to adapt the encoded signal from the Trellis encoder 214 into a puncture coded signal. For a Trellis encoded signal having 4 redundant error correcting bits for every 4 bits of input data, the puncture processor 122 may puncture or drop 1 to 4 of these redundant bits depending on the signal received adaptive controller 110 in response to the channel quality measure. As such, the inventive puncture encoder 112 reduces the transmission of redundant error correcting bits over standard encoders, e.g., a Trellis encoder, a Reed-Solomon encoder, a combination Reed-Solomon and Trellis encoder, and the like. This reduction of redundant error correcting bits avoids the transmission of unnecessary information and improves the overall code rate of the puncture encoder 112.

The adaptive controller 110 comprises a memory 254 and a central processing unit (CPU) 256. The memory 254 stores a program executed by the CPU 256 to implement the adaptive puncture coding of the present invention. Specifically, the adaptive controller 110 receives the channel quality measure from the back channel 116 and adaptively determines the code rate of the puncture encoder 112. To perform this determination, the adaptive controller 110 uses a look up table or a puncture matrix.

The code rate is the ratio of bits in an input data block to the total number of output bits the puncture encoder 112 transmits for each input data block in a sequence of data blocks. Thus, if the channel quality measure indicates a low information channel quality, e.g., low SNR or high BER, the adaptive controller 110 selects a low code rate. To implement the low code rate, the puncture processor 122 will transmit more error correcting bits for an input data block. Similarly, if the channel quality measure indicates a high information channel quality, e.g., high SNR or low BER, the adaptive controller 110 selects a high code rate. To implement the low code rate, the puncture processor 122 will transmit more error correcting bits for an input data block. As such, the puncture encoder 112 adaptive may increase or decrease the transmission or redundant error correcting bits in response to the channel quality measure for the forward information channel 114.

The encoded signal is coupled to modulator 218, where the signal is modulated onto a 5–6 GHz carrier. The modulation is an M-ary quadrature amplitude modulation (QAM). To transmit broadband signals such as HDTV, the modulation is selected to be 256-ary QAM. For lower bandwidth signals, the modulation index can be lowered to, for example, 64.

The radio transmitter 228 amplifies the modulated signal and couples the signal to an antenna 106. Specifically, the signal passes through a wide-band amplifier 232 and a bandpass filter 234. The radio transmitter 228 transmits a 1 Watt signal in the 5.75–5.85 GHz band (the UNII-band). Each of the transmitted signals carries 20–40 Mbps in a channel bandwidth of approximately 6 MHz. As such, many 6 MHz channels (one or more for each appliance) are transmitted in the UNII-band.

Additional antenna elements could be used with dynamic, beam forming circuitry such that the transmitted signal is "pointed" at the appliance 108 that is to receive the signal being transmitted at any instant in time. Such antenna control provides multipath signal suppression at the data receiver 106.

The gateway is also coupled an antenna 238 to receive control signals from various appliances within the residence or enterprise. In one embodiment only a single antenna is coupled to the back channel receiver 201 in the gateway 200. In another embodiment (not shown), both antennas 236 and 238 are coupled to the back channel receiver 201 via a splitter/combiner (not shown) and a diplexer (not shown). Because the back channel data rate is relatively low, the back channel modulation is generally BPSK, QPSK or 4-ary QAM, both of which are relatively easy to receive, even in a noisy environment.

The received signal, known as a "back-channel signal", is coupled through a band pass filter 240, an amplifier 242, a mixer 246 and into the demodulator 220. The radio receiver 230 uses the amplifier 242 to provide amplification, and uses the mixer 246 and a local oscillator 234 to perform downconversion. Such amplification and downconversion is performed such that the output of the radio transmitter 228 is an IF signal with a relatively high signal-to-noise ratio (SNR). The back channel signal is transmitted from the network appliance 108 using 100 mW and typically uses the 5.125–5.325 GHz band (the UNII-band) of the back channel 116. The back channel 116 can support 10 Mbits/sec using burst mode QPSK modulation. In the present invention, the back channel signal is a control signal containing channel quality measure information. Additionally, the back channel signal may carry commands from the network appliance 108 to instruct the gateway 200 as to what signals to transmit to the appliance 108.

The demodulator 220 extracts the baseband signal from the carrier signal and couples the baseband signal to the decoder 222. The decoder 222 decodes the baseband signal. The decoded signals are coupled to the adaptive controller 110, where the determination of redundant signals in the puncture code is determined in response to the decoded control signal.

Figure 3:
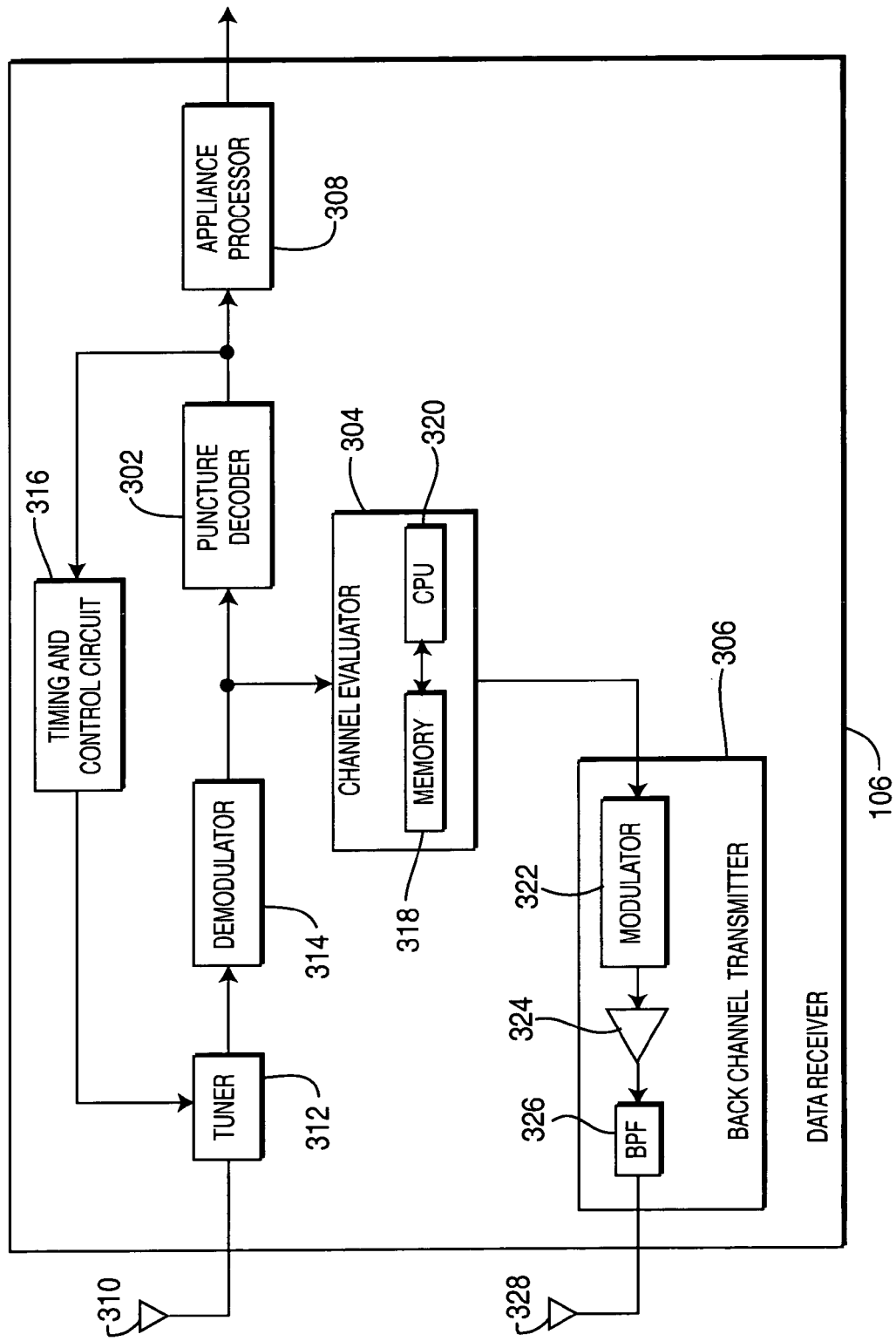
FIG. 3 depicts a block diagram of one embodiment of a data receiver of FIG. 1.

FIG. 3 depicts a block diagram of a data receiver 106 of FIG. 1 that operates in combination with the data transmitter 104 in the communications system 100. The data receiver 106 receives a puncture coded signal, evaluates the received puncture coded signal to determine a channel quality measure, transmits a control signal containing the channel quality measure over the back channel 116 and converts the puncture coded signal into a format suitable for a network appliance 108. In one embodiment, the data receiver 106 comprises a puncture decoder 302, a channel evaluator 304, a back channel transmitter 306, and an appliance processor 308.

The data receiver 106 uses an antenna 310 to receive the puncture coded signal. The tuner 312 tunes the received signal at a frequency determined using a local oscillator (not shown). The demodulator 314 demodulates the tuned signal into a baseband video signal by using a demodulation scheme that reverses the modulation performed by the modulator 218. The demodulated signal is coupled to the puncture decoder 302 and the channel evaluator 302.

The puncture decoder 302 decodes the demodulated signal into the original video signal or symbol stream as received by the data transmitter 104 from the data source 102. This puncture decoded video signal is coupled to the appliance processor 308 and the timing and control circuits 316. The appliance processor 308 performs the necessary processing to convert the symbol stream into a signal that can be used by the network appliance 108. For example, if the appliance 108 is a NTSC television, the appliance specific processor 308 would convert the symbol stream into an NTSC signal. Receivers 106 designed for other types of appliances 108 convert the symbols into signals that are appropriate for those appliances. The timing and control circuits 316 derive timing signals to ensure proper operation of the tuner 312.

The channel evaluator 304 comprises a memory 318 and a CPU 320. The memory 318 stores a program executed by the CPU 320 to implement the channel evaluator 304. Specifically, the channel evaluator 304 evaluates the baseband video signal to determine a channel quality measure for the forward information channel 114. Examples of the channel quality measure include a signal to noise ratio, bit error rate, and the like. The channel evaluator 304 then transmits the channel quality measure in the form of a signal, e.g., a control signal. As the quality of the information channel 114 may vary with time, the channel evaluator 304 provides either a continuous or periodic update of the channel quality measure used to provide the adaptive puncture coding of the present invention.

The control signal containing the channel quality measure is transmitted to the back channel 116 via the back channel transmitter 306 comprising a modulator 320, an amplifier 324 and a bandpass filter 326. The modulator 320 modulates the signal using a modulation scheme for the relatively low data rate of the back channel 116. The modulation is generally BPSK, QPSK or 4-ary QAM. The modulated signal is amplified at the amplifier, passed through at the bandpass filter 326 and transmitted at the antenna 328.

Although the illustrative channel evaluator 304 measures the channel quality (of the forward channel 114) at the data receiver 106, other locations for the channel evaluator 304 are possible. For example, the channel evaluator 304 may be located at the data transmitter 112 or a location within the network 118.

Although various embodiments which incorporate the teachings of the present invention have been shown and described in detail herein, those skilled in the art can readily devise many other varied embodiments that still incorporate these teachings.

What is claimed is:

1. A method for producing a puncture coded signal from a data signal, where the data signal comprises a sequence of data blocks, said method comprising:
   generating a channel coded signal from the data signal, where said channel coded signal has, for each data block in said sequence of data blocks, a number of bits equal to a number of bits in a particular data block plus an initial number of error correcting bits; and
   adjusting, in response to a channel quality measure of an information channel, the number of error correcting bits to generate said puncture coded signal from said channel coded signal.

2. The method of claim 1 further comprising;
   receiving a control signal comprising said channel quality measure.

3. The method of claim 1 wherein said adjusting comprises:
   increasing the number of error correcting bits if said channel quality measure indicates a low information channel quality.

4. The method of claim 1 wherein said adjusting comprises:
   decreasing the number of error corrected bits if said channel quality measure indicates a high information channel quality.

5. The method of claim 1 wherein said channel quality measure comprises a signal to noise ratio or a bit error rate.

6. The method of claim 1 wherein said channel coded signal is generated in accordance to a channel code comprising at lease one of a Reed-Solomon block code and a Trellis convolutional code.

7. The method of claim 6 wherein, for every four bits of said data signal, said channel coded signal comprises an eight bit Trellis convolutional code having four error correcting bits.

8. The method of claim 7 wherein said puncture coded signal contains between one to four error correcting bits for every four bits of said data signal, where the number of error correcting bits in said puncture coded signal is dependent on said channel quality measure.

9. The method of claim 1 wherein the information channel comprises a wireless local area network between a gateway and a receiver coupled to a network appliance.

10. The method of claim 1 wherein said data signal comprises at least one signal from a group comprising analog cable television, digital cable television, plain old telephone signals, digital subscriber line signals, satellite television signals, over-the-air television signals and any combination thereof.

11. A method for transmitting a data signal over an information channel, where the data signal comprises a sequence of data blocks, said method comprising:
generating a channel coded signal from the data signal, where said channel coded signal has, for each data block in said sequence of data blocks, a number of bits equal to the number of bits in a particular data block plus an initial number of error correcting bits;
reducing the initial number of error correcting bits in response to a control signal comprising a channel quality measure;
generating a puncture coded signal having, for each data block in said sequence of data blocks, a total number of bits equal to said input data signal and said reduced number of error correcting bits;
measuring a channel quality measure from said generated puncture coded signal; and
generating said control signal comprising said channel quality measure to a back channel.

12. The method of claim 11 further comprising:
receiving said generated puncture coded signal over the information channel;
decoding said received puncture coded signal; and
converting said decoded puncture coded signal into a suitable format for a network appliance.

13. Apparatus for producing a puncture coded signal from a data signal where the data signal comprises a sequence of data blocks, said apparatus comprising:
an adaptive controller for adjusting in response to a channel quality measure for an information channel, a number of error correcting bits to transmit in said puncture coded signal; and
a puncture encoder for generating, said puncture coded signal from the data signal, where said puncture coded signal has, for each data block in said sequence of data blocks, a number of bits equal to a number of bits in a particular data block plus an adjusted number of error correcting bits.

14. The apparatus of claim 13 further comprising:
a back channel receiver for receiving a control signal comprising said channel quality measure.

15. The apparatus of claim 13 wherein said puncture encoder comprises;
a conventional encoder for generating a channel coded signal from the data signal, where said channel coded signal has, for each data block in said sequence of data blocks, a number of bits equal to the number of bits in a particular data block plus an initial number of error correcting bits; and
a puncture processor for adjusting the initial number of error correcting bits of the channel coded signal to generate said puncture coded signal.

16. The apparatus of claim 15 wherein said conventional encoder comprises at least one of a Reed-Solomon encoder and a Trellis encoder, and said channel coded signal is generated in accordance to a channel code comprising at least one of a Reed-Solomon block code and a Trellis convolutional code.

17. The apparatus of claim 16 wherein, for each data block comprising four bits in said sequence of data blocks, said channel coded signal comprises an eight bit Trellis convolutional coded signal with four error correcting bits.

18. The apparatus of claim 17 wherein said puncture coded signal contains between one to four error correcting bits for every four bits of said data signal, where the number of error correcting bits in said puncture coded signal is dependent on said channel quality measure.

19. The apparatus of claim 13 further comprising:
a channel evaluator for determining a channel measure for said puncture coded signal transmitted over the information channel; and
a back channel transmitter for generating a control signal indicative of said channel quality measure.

20. The apparatus of claim 13 further comprising:
a puncture decoder for decoding said puncture coded signal transmitted over the information channel; and
an appliance processor for converting said decoded puncture coded signal into a suitable format for a network appliance.

21. The apparatus of claim 13 wherein said adaptive controller increases a number of redundancy bits if said channel quality measure indicates a low information channel quality.

22. The apparatus of claim 13 wherein said adaptive controller decreases the number of error correcting bits if said channel quality measure indicates a high information channel quality.

23. The apparatus of claim 13 wherein said channel quality measure comprises a signal to noise ratio or a bit error rate.

24. The apparatus of claim 13 wherein the information channel comprises a wireless local area network between a gateway and a receiver coupled to a network appliance.

25. The apparatus of claim 13 wherein said data signal comprises at least one signal from a group comprising analog cable television, digital cable television, plain old telephone signals, digital subscriber line signals, satellite television signals, over-the-air television signals and arty combination thereof.

* * * * *